United States Patent
Song (10) Patent No.: US 9,612,474 B2
(45) Date of Patent: Apr. 4, 2017

(54) BACKLIGHT ASSEMBLY AND DISPLAY DEVICE INCLUDING THE SAME

(71) Applicant: Samsung Display Co., Ltd., Yongin, Gyeonggi-Do (KR)

(72) Inventor: Si Joon Song, Suwon-si (KR)

(73) Assignee: Samsung Display Co., Ltd. (KR)

(*) Notice: Subject to any disclaimer, the term of this patent is extended or adjusted under 35 U.S.C. 154(b) by 261 days.

(21) Appl. No.: 14/273,386

(22) Filed: May 8, 2014

(65) Prior Publication Data

US 2015/0211715 A1  Jul. 30, 2015

(30) Foreign Application Priority Data

Jan. 29, 2014 (KR) .................. 10-2014-0011608

(51) Int. Cl.
*G02F 1/1335* (2006.01)
*F21Y 101/00* (2016.01)

(52) U.S. Cl.
CPC ...... *G02F 1/1336* (2013.01); *G02F 1/133603* (2013.01); *G02F 1/133608* (2013.01); *F21Y 2101/00* (2013.01)

(58) Field of Classification Search
CPC .. F21K 9/50; F21Y 2101/02; F21Y 2105/001; F21Y 2113/005; F21Y 2101/025; F21Y 2103/00; F21Y 2103/003; F21Y 2103/022; F21Y 2111/001; F21Y 2101/00; G02B 27/0176; G02B 19/0028; G02B 6/0055; G02B 6/0073; F21V 13/04; F21V 5/04; G02F 1/1336; G02F 1/133608; G02F 1/133603

See application file for complete search history.

(56) References Cited

U.S. PATENT DOCUMENTS

| 8,045,091 B2 | 10/2011 | Park |
| 2007/0189011 A1 | 8/2007 | Song et al. |
| 2011/0096265 A1 | 4/2011 | Murakoshi et al. |
| 2011/0109814 A1* | 5/2011 | Takemura ......... G02F 1/133605 348/790 |
| 2012/0086871 A1 | 4/2012 | Yokota |
| 2012/0092568 A1 | 4/2012 | Yokota |

(Continued)

FOREIGN PATENT DOCUMENTS

| JP | 2005-092000 | 4/2005 |
| JP | 2011-023176 | 2/2011 |

(Continued)

*Primary Examiner* — Ahn Mai
*Assistant Examiner* — Fatima Farokhrooz
(74) *Attorney, Agent, or Firm* — Innovation Counsel LLP (57) ABSTRACT

Provided are a backlight assembly and a display device including the same.

The backlight assembly comprises: a housing; a plurality of light sources disposed on the housing; a plurality of optical lenses disposed on the light sources, respectively; a main reflective sheet covering an upper surface of the housing and comprising a reflective portion and a main opening which exposes each of the optical lenses; and a sub reflective sheet disposed under each of the optical lenses, wherein the sub reflective sheet comprises a body portion and a fitting portion partially separated from the body portion and is fitted to the main reflective sheet in the reflective portion.

20 Claims, 11 Drawing Sheets

(56) References Cited

U.S. PATENT DOCUMENTS

| | | | |
|---|---|---|---|
| 2012/0099026 A1* | 4/2012 | Yokota | G02B 19/0061 348/739 |
| 2012/0262631 A1 | 10/2012 | Kuromizu | |
| 2013/0050588 A1* | 2/2013 | Kamada | G02F 1/133603 348/739 |
| 2013/0050589 A1* | 2/2013 | Kamada | G02F 1/133605 348/739 |
| 2014/0061684 A1* | 3/2014 | Marutani | H01L 33/62 257/88 |
| 2014/0098520 A1* | 4/2014 | Takeuchi | G02F 1/133603 362/97.1 |
| 2014/0185296 A1* | 7/2014 | Inobe | F21V 21/14 362/249.08 |
| 2014/0321156 A1* | 10/2014 | Yoshikawa | G02B 6/0055 362/607 |
| 2015/0226400 A1* | 8/2015 | Wada | G02F 1/133611 362/97.1 |

FOREIGN PATENT DOCUMENTS

| | | |
|---|---|---|
| JP | 2011-165434 | 8/2011 |
| JP | 2011-248121 | 12/2011 |
| JP | 2013-118055 | 6/2013 |
| JP | 2013-118117 | 6/2013 |

\* cited by examiner

BACKLIGHT ASSEMBLY AND DISPLAY DEVICE INCLUDING THE SAME

This application claims priority to Korean Patent Application No. 10-2014-0011608 filed on Jan. 29, 2014 in the Korean Intellectual Property Office, the disclosure of which is incorporated herein by reference in its entirety.

BACKGROUND

1. Field

The inventive concept relates to a backlight assembly and a display device including the same.

2. Description of the Related Art

A liquid crystal display (LCD) displays an image by altering the arrangement of the liquid crystals disposed between two glass substrates. The altering the arrangement of the liquid crystals is performed by applying different voltages to electrodes in the upper and lower glass substrates. Unlike cathode ray tubes (CRTs) and plasma display panels (PDPs), LCDs are non-self-luminous display devices. Therefore, LCDs cannot be used in places without light. To overcome this drawback and use LCDs in dark places, a backlight assembly which irradiates light uniformly to a liquid crystal display panel is required.

A backlight assembly includes a light source, a diffusion plate, and optical sheets. A light-emitting diode (LED) light source having high efficiency is widely used as the light source of the backlight assembly. In a direct-illumination type backlight assembly, an optical lens is placed on an LED light source in order to increase the diffusion of light emitted from the LED light source.

In this case, light emitted upward from the LED light source is diffused by the optical lens. However, light emitted from sides of the LED light source or emitted downward from the LED light source fails to enter the optical lens and leaks toward a lower housing. To recycle the leaked light, a reflective sheet is placed on the lower housing.

Here, the reflective sheet should not cover the optical lens. Thus, the reflective sheet includes an opening through which the optical lens can pass. Meanwhile, no reflective sheet is placed under the optical lens. Therefore, it is difficult to reflect light properly. To improve reflection efficiency, a sub reflective sheet may be placed under the optical lens. However, if the sub reflective sheet is not properly coupled to a main reflective sheet, a lifting of the main reflective sheet may occur, thereby degrading light quality.

SUMMARY

Aspects of the inventive concept provide a backlight assembly which can improve luminance by having high reflection efficiency and improve light quality by suppressing the lifting of a reflective sheet.

Aspects of the inventive concept also provide a display device having high luminance and improved display quality.

However, aspects of the inventive concept are not restricted to the one set forth herein. The above and other aspects of the inventive concept will become more apparent to one of ordinary skill in the art to which the inventive concept pertains by referencing the detailed description of the inventive concept given below.

According to an aspect of the inventive concept, there is provided a backlight assembly comprising: a housing; a plurality of light sources disposed on the housing; a plurality of optical lenses disposed on the light sources, respectively; a main reflective sheet covering an upper surface of the housing and comprising a reflective portion and a main opening which exposes each of the optical lenses; and a sub reflective sheet disposed under each of the optical lenses, wherein the sub reflective sheet comprises a body portion and a fitting portion partially separated from the body portion and is fitted to the main reflective sheet in the reflective portion.

A periphery of the body portion of the sub reflective sheet is disposed on one surface of the main reflective sheet and the fitting portion of the sub reflective sheet is disposed on the other surface of the main reflective sheet.

The fitting portion may be partially separated from the body portion by a cutting portion.

The fitting portion may include a first end, sides, and a second end, wherein the first end is formed integrally with the body portion.

The first end may be located inside than an outer circumference of the body portion.

The second end may be protruded toward the outside than the outer circumference of the body portion.

The cutting portion may include a concave portion whose width decreases toward the inside of the body portion.

A diameter of the body portion of the sub reflective sheet may be greater than a diameter of the main opening.

The backlight assembly further may comprise a lens support which supports each of the optical lenses and separates each of the optical lenses from a surface of the housing, wherein each of the light sources comprises a light-emitting diode (LED) chip, and the sub reflective sheet comprises a sub opening which exposes the LED chip and the lens support.

According to another aspect of the inventive concept, there is provided a backlight assembly comprising: a housing; a plurality of light sources disposed on the housing; a plurality of optical lenses disposed on the light sources, respectively; a main reflective sheet covering an upper surface of the housing and comprising a reflective portion, a fitting portion and a main opening which exposes each of the optical lenses, wherein the fitting portion is separated from the reflective portion by a cutting portion and is fitted to the sub reflective sheet.

A periphery of the reflective portion of the main reflective sheet is disposed on one surface of the sub reflective sheet and the fitting portion of the main reflective sheet is disposed on the other surface of the sub reflective sheet.

A circumference of the sub reflective sheet is larger than a circumference of the main opening.

The fitting portion may include a first end, sides, and a second end, wherein the first end is formed integrally with the body portion.

The second end may protrude toward the inside of the main opening.

According to another aspect of the inventive concept, there is provided a display device comprising: a display panel; and a backlight assembly disposed under the display panel, wherein the backlight assembly comprises: a lower housing; a plurality of light sources disposed on the housing; a plurality of optical lenses disposed on the light sources, respectively; a main reflective sheet covering an upper surface of the housing and comprising a reflective portion and a main opening which exposes each of the optical lenses; and a sub reflective sheet disposed under each of the optical lenses, wherein the sub reflective sheet comprises a body portion and a fitting portion partially separated from the body portion and is fitted to the main reflective sheet in the reflective portion.

A periphery of the body portion of the sub reflective sheet may be disposed on a surface of the main reflective sheet, and the fitting portion of the sub reflective sheet is disposed on the other surface of the main reflective sheet.

The fitting portion may be partially separated from the body portion by a cutting portion.

The fitting portion may include a first end, sides, and a second end, wherein the first end is formed integrally with the body portion.

The first end may be located inside of an outer circumference of the body portion.

The second end may be protruded toward the outside than the outer circumference of the body portion.

BRIEF DESCRIPTION OF THE DRAWINGS

The above and other aspects and features of the inventive concept will become more apparent by describing in detail exemplary embodiments thereof with reference to the attached drawings, in which.

DETAILED DESCRIPTION

Advantages and features of the inventive concept and methods of accomplishing the same may be understood more readily by reference to the following detailed description of preferred embodiments and the accompanying drawings. The inventive concept may, however, be embodied in many different forms and should not be construed as being limited to the embodiments set forth herein. Rather, these embodiments are provided so that this disclosure will be thorough and complete and will fully convey the inventive concept to those skilled in the art, and the inventive concept will only be defined by the appended claims.

It will also be understood that when a layer is referred to as being "on" another layer or substrate, it can be formed directly on the other layer or substrate, or be formed with intervening layers. The same reference numbers indicate the same components throughout the specification.

It will be understood that, although the terms first, second, third etc. may be used herein to describe various elements, components, regions, layers and/or sections, these elements, components, regions, layers and/or sections should not be limited by the terms used. The terms are only used to distinguish one element, component, region, layer or section from another element, component, region, layer or section. Thus, a first element, component, region, layer or section discussed below could be termed a second element, component, region, layer or section without departing from the teachings of the inventive concept.

Hereinafter, embodiments of the inventive concept will be described with reference to the attached drawings.

Figure 1:
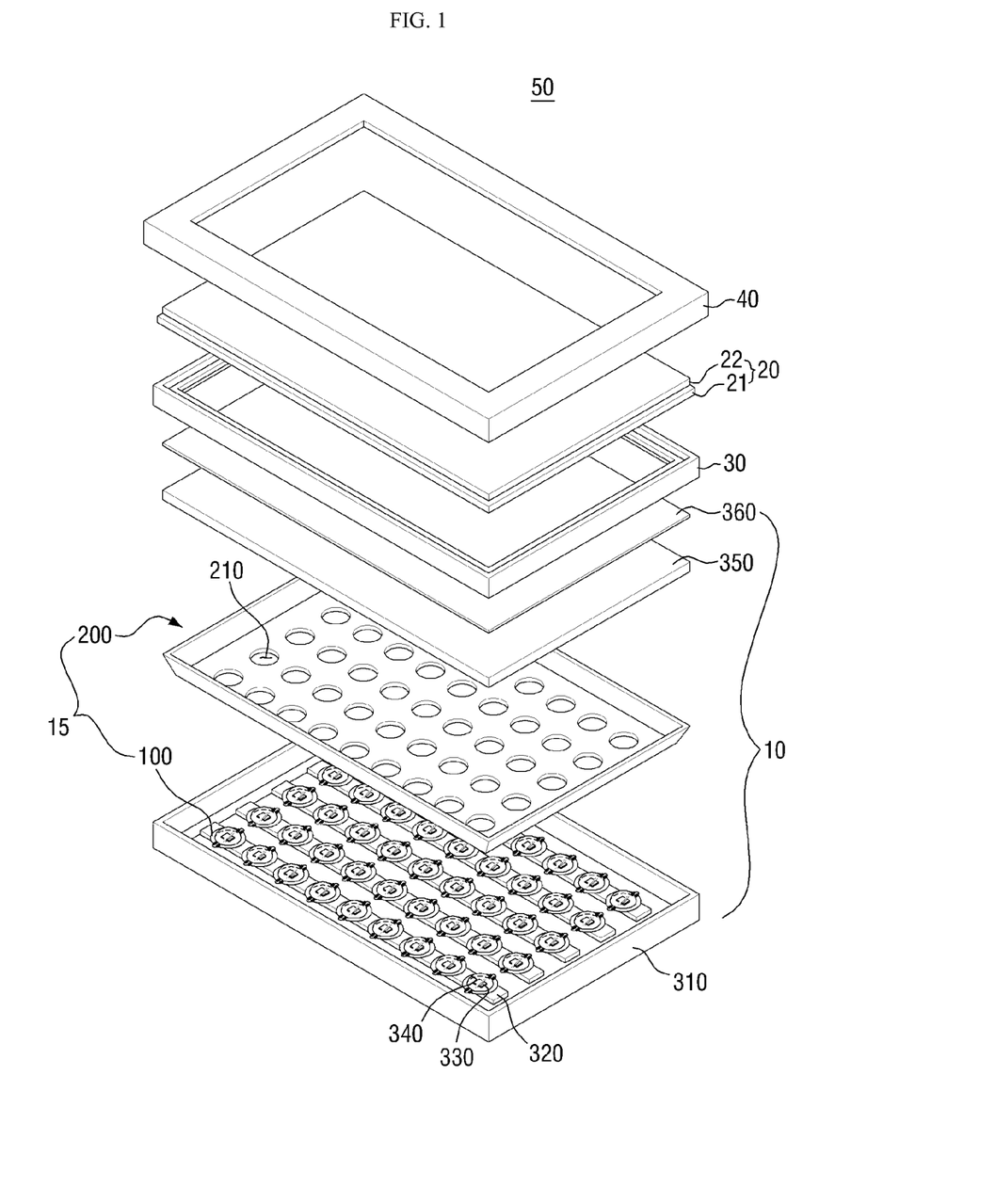
FIG. 1 is an exploded perspective view of a backlight assembly according to an embodiment of the inventive concept.

FIG. 1 is an exploded perspective view of a display device according to an embodiment of the inventive concept.

Referring to FIG. 1, the display device 50 includes a display panel 20 and a backlight assembly 10 disposed under the display panel 20.

The display panel 20 may include an upper display substrate 22 and a lower display substrate 21 which face each other. The upper display substrate 22 and the lower display substrate 21 may be coupled to each other by a sealant (not shown). A liquid crystal layer (not shown) may be interposed between the upper display substrate 22 and the lower display substrate 21. A polarizing sheet (not shown) may be attached to the outside of the upper display substrate 22 and the lower display substrate 21.

A plurality of pixel electrodes, wirings for driving the pixel electrodes, and switching elements may be formed in the lower display substrate 21. In addition, a common electrode may be provided in the upper display substrate 22 or the lower display substrate 21 to apply an electric field to the liquid crystal layer. A color filter and a black matrix may be formed in the upper display substrate 22 or the lower display substrate 21.

The backlight assembly 10 may include a lower housing 310, a light source module, a reflective sheet 15, an optical plate 350, and an optical sheet 360.

The lower housing 310 accommodates the light source module, the reflective sheet 15, the optical plate 350, the optical sheet 360, etc. The lower housing 310 may be a bottom chassis. The lower housing 310 may include a recessed portion 312 (see FIG. 3) in which the light source module is placed.

The light source module provides light to the display panel 20. The light source module may include a plurality of light sources. The light sources may be point light sources. Examples of the point light sources may include light-emitting diode (LED) light sources. Each of the LED light sources may include an LED chip 330 and an optical lens 340. The LED chip 330 may be mounted on a substrate. The substrate on which the LED chip 330 is mounted may be a bar-type printed circuit board (PCB) 320. A plurality of LED chips 330 may be mounted on the PCB 320, and the optical lens 340 may be disposed on each of the LED chips 330. The optical lens 340 may diffuse light emitted from each of the LED chips 330. The light source module may include a plurality of bar-type PCBs 320 on which a plurality of LED chips 330 are mounted. The number of the LED chips 330 mounted on each of the PCBs 320 may be equal or different. The PCBs 320 on which the LED chips 330 are mounted may be arranged parallel to each other. Each of the PCBs 320 may be placed in the recessed portion 312 (see FIG. 3) of the lower housing 310. The light source module will be described in greater detail later.

The reflective sheet 15 reflects light traveling downward toward an upward direction. The reflective sheet 15 includes a main reflective sheet 200 and a sub reflective sheet 100. The main reflective sheet 200 may be formed as a single piece. The main reflective sheet 200 may include a reflective portion and a plurality of main openings 210. The number of openings may be equal to the number of the LED chips 330. The sub reflective sheet 100 may be formed in a plurality. The number of the sub reflective sheets 100 may be equal to the number of the LED chips 330. The sub reflective sheets 100 may be disposed on the lower housing 310 while being fitted into the main openings 210 of the reflective sheet 15, respectively. The sub reflective sheet 100 and the main reflective sheet 200 may be made of the same material and formed to have an equal thickness, but the inventive concept is not limited thereto.

As a light-modulating structure that modulates light, the optical plate 350 and/or the optical sheet 360 may be disposed on the light source module. In an exemplary embodiment, the optical plate 350 may be a diffusion plate. The optical sheet 360 may be a prism sheet, a diffusion sheet, a microlens sheet, a lenticular sheet, a phase-difference compensation sheet or a reflective polarizing sheet, etc. and any combination thereof. A composite optical sheet in which more than one of the above light modulating characteristics is incorporated into one optical sheet 360 may be used. Various combinations of the light-modulating structures are widely known to those skilled in the art, and thus a detailed description thereof will be omitted.

The display panel 20 may be seated in a middle housing 30. The middle housing 30 may be a mold frame or a middle mold. The middle housing 30 may be coupled to the lower housing 310. The optical plate 350 and/or the optical sheet 360 may be seated in the lower housing 310 or the middle housing 30. In the drawing, the middle housing 30 is shaped like a quadrilateral frame. However, the middle housing 30 may also be provided as two bars, and the two bars may be placed on long or short sides of the display device 50.

An upper housing 40 may be disposed on the display panel 20. The upper housing 40 may be a top chassis or a bezel. The upper housing 40 may include an open window and covers edges of the display panel 20 to protect them. The upper housing 40 may be coupled to the lower housing 310.

The light source module and the reflective sheet 15 will now be described in greater detail.

Figure 2:
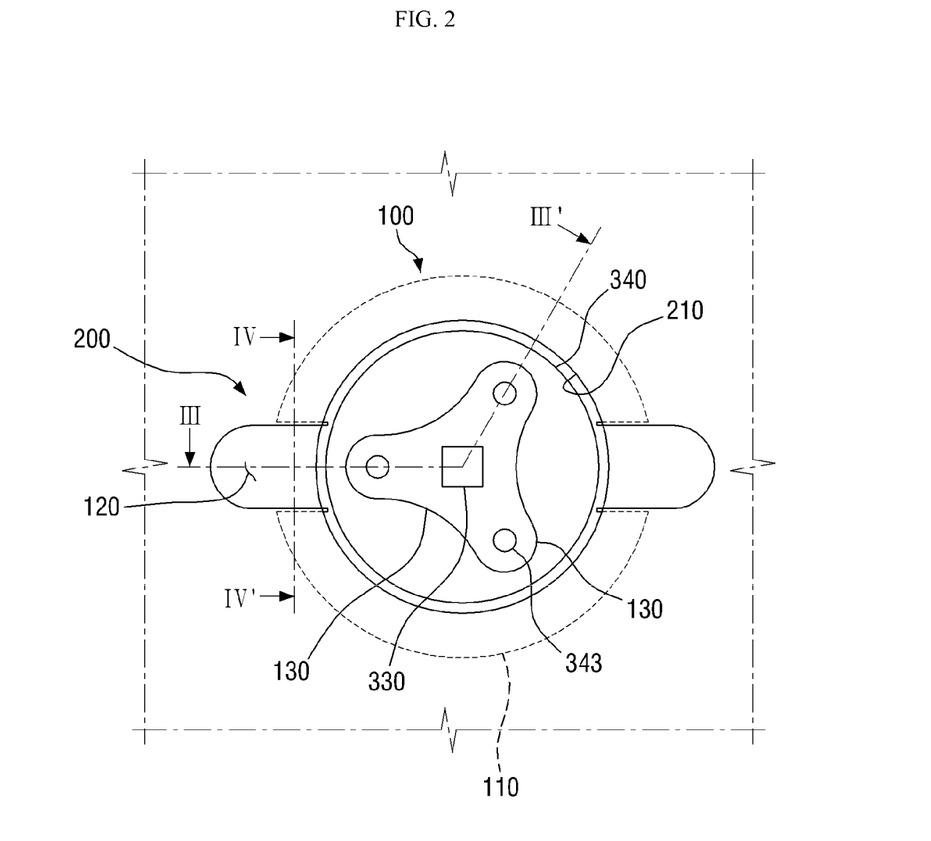
FIG. 2 is a partial layout view illustrating a light source module and a reflective sheet coupled to each other in a display device according to an embodiment of the inventive concept.
Figure 3:
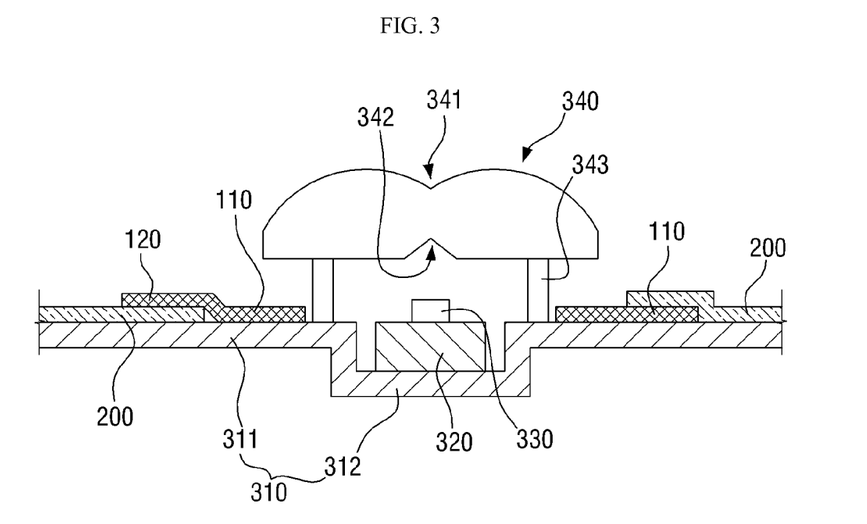
FIG. 3 is a cross-sectional view taken along the line III-III' of FIG. 2.
Figure 4:
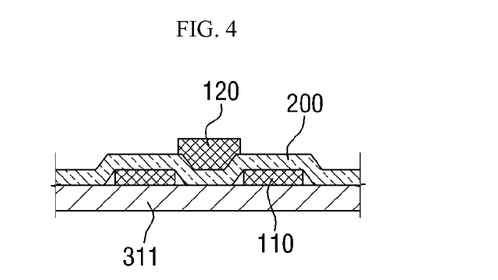
FIG. 4 is a cross-sectional view taken along the line IV-IV' of FIG. 3.

FIG. 2 is a partial layout view illustrating a light source module and a reflective sheet coupled to each other in a display device according to an embodiment of the inventive concept. FIG. 3 is a cross-sectional view taken along the line III-III' of FIG. 2. FIG. 4 is a cross-sectional view taken along the line IV-IV' of FIG. 3.

Referring to FIGS. 2 through 4, the lower housing 310 includes a bottom portion 311 and the recessed portion 312 which is recessed downward from a surface of the bottom portion 311. The recessed portion 312 may be a line shape, and a PCB 320 is disposed in the recessed portion 312. A depth of the recessed portion 312 may be substantially equal to a thickness of the PCB 320. In this case, the surface of the bottom portion 311 and a surface of the PCB 320 may be located at substantially the same level.

An LED chip 330 is mounted on the PCB 320. The LED chip 330 may emit white light. In an example, the LED chip 330 may emit white light by including a blue LED chip, a red LED chip, and a green LED chip. In another example, the LED chip 330 may emit white light by including a blue light-emitting element and a fluorescent layer that contains fluorescent materials having red and green emission peaks in response to blue light or a fluorescent material having a yellow emission peak in response to the blue light. In another example, the LED chip 330 may emit white light by including an ultraviolet (UV) light-emitting element and a fluorescent layer that contains fluorescent materials having red, green and blue emission peaks in response to UV light. The configuration of the LED chip 330 emitting white light is not limited to the above examples.

An optical lens 340 is disposed on the LED chip 330. The optical lens 340 may diffuse light emitted from the LED chip 330. The optical lens 340 may be circular when viewed from above. An upper surface of the optical lens 340 includes a convex surface. An upper groove 341 may be formed in the upper surface of the optical lens 340. A lower groove 342 may be formed in a lower surface of the optical lens 340. The upper groove 341 and the lower groove 342 may be located in the middle of the optical lens 340 and may overlap each other. In addition, the LED chip 330 may be located at a position corresponding to the middle of the optical lens 340 and thus overlaps the upper groove 341 and the lower groove 342.

Lens supports 343 may be formed on the lower surface of the optical lens 340. The lens supports 343 may be shaped like pillars. In the drawings, three lens supports 343 are illustrated as an example. However, the number of the lens supports 343 may also be four or more or may be less than three. Bottom surfaces of the lens supports 343 may be coupled to the lower housing 310. For example, the bottom surface of the lens supports 343 may be coupled to the surface of the bottom portion 311 of the lower housing 310 by an adhesive layer (not shown). The lens supports 343 may separate the optical lens 340 from the LED chip 330 by a predetermined distance.

The LED chip 330 and the optical lens 340 are inserted into a main opening 210 of the main reflective sheet 200. A sub reflective sheet 100 is disposed under the optical lens 340. The sub reflective sheet 100 will now be described in detail with reference to FIGS. 5 and 6.

Figure 5:
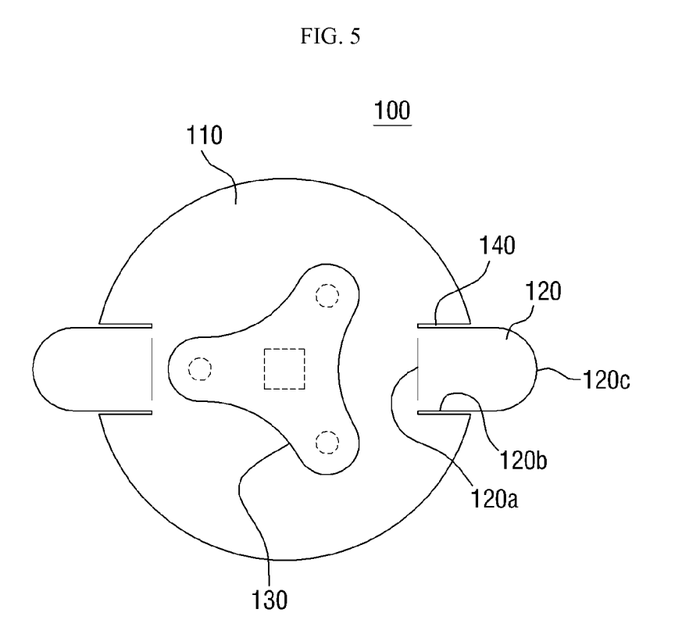
FIG. 5 is a plan view of a sub reflective sheet according to an embodiment of the inventive concept.
Figure 6:
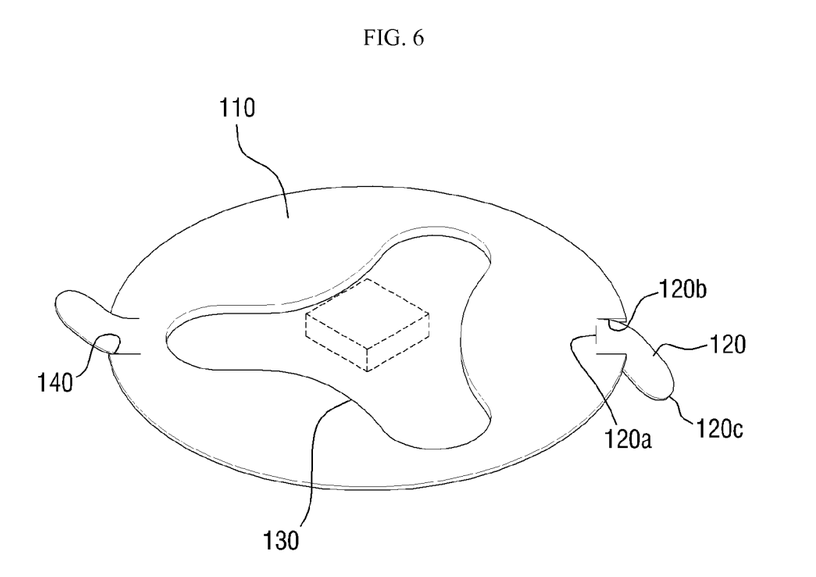
FIG. 6 is a perspective view of the sub reflective sheet according to an embodiment of the inventive concept.

FIG. 5 is a plan view of a sub reflective sheet according to an embodiment of the inventive concept. FIG. 6 is a perspective view of the sub reflective sheet according to an embodiment of the inventive concept. Referring to FIGS. 5 and 6, the sub reflective sheet 100 includes a body portion 110 and a fitting portion 120.

An outer circumference of the body portion 110 may be substantially circular when viewed from above. A sub opening 130 is formed in the body portion 110. The sub opening 130 provides a space into which an LED chip 300 and lens supports 343 are inserted. The sub opening 130 may be formed along the periphery of the space in which the LED chip 330 and the lens supports 343 are disposed.

The fitting portion 120 is partially separated from the body portion 110. The fitting portion 120 may have a shape like a boss that protrudes outward from a first end 120a. The first end 120a of the fitting portion 120 is connected to the body portion 110. The fitting portion 120 may be integrally connected to the body portion 110 at the first end 120*a*. A connecting portion of the fitting portion 120 and the body portion 110 may be located inside the outer circumference of the body portion 110 having circular shape.

Both sides 120*b* of the fitting portion 120 which face each other may be separated from the body portion 110 by cutting portions 140, respectively. Each of the cutting portions 140 may be defined as a gap having a fine width between the fitting portion 120 and the body portion 110. The sides 120*b* of the fitting portion 120 may be formed as lines parallel to each other or straight lines heading toward a center of the body portion 110, but the inventive concept is not limited thereto. A second end 120*c* of the fitting portion 120 may be curved. The second end 120*c* of the fitting portion 120 may protrude outward than the outer circumference of the body portion 110.

Since an area including the sides 120*b* of the fitting portion 120 and the second end 120*c* is separated from the body portion 110, the fitting portion 120 can move independently in a vertical direction with respect to the body portion 110. That is, the fitting portion 120 can be bent or folded upward or downward from the body portion 110. If the fitting portion 120 is placed in the same plane with the body portion 110 (that is, the state that the sub reflective sheet 100 is not fitted to the main reflective sheet 200), the sides 120*b* of the fitting portion 120 may be adjacent to the body portion 110.

The sub reflective sheet 100 may include a plurality of fitting portions 120. In the drawings, two fitting portions 120 are arranged to have a line of symmetry.

Referring back to FIGS. 2 through 4, the sub reflective sheet 100 under the optical lens 340 is disposed on the lower housing 310. A diameter or width of the body portion 110 of the sub reflective sheet 100 may be greater than that of the optical lens 340 and that of the main opening 210 of the main reflective sheet 200. In addition, the diameter or width of the main opening 210 of the main reflective sheet 200 may be greater than that of the optical lens 340. The main reflective sheet 200 may overlap a periphery of the body portion 110.

The periphery of the body portion 110 may be disposed on one surface (e.g., a lower surface) of the main reflective sheet 200. On the other hand, the fitting portions 120 may be disposed on the other surface (e.g., an upper surface) of the main reflective sheet 200. As each of the fitting portions 120 is bent upward, a space of the cutting portion 140 is widened. Accordingly, the sub reflective sheet 100 may be fitted into the main opening 210 of the main reflective sheet 200 through the space. After the sub reflective sheet 100 is fitted to the main reflective sheet 200 by the fitting portions 120, the movement of the sub reflective sheet 100 relative to the main reflective sheet 200 may be limited. This can prevent or reduce the lifting of the sub reflective sheet 100 or the main reflective sheet 200, thereby improving the light quality of the backlight assembly 10 and the display quality of the display device 50.

In addition, since the sub reflective sheet 100 is disposed under the optical lens 340, even if light emitted from the LED chip 300 travels downward, opposite to the optical lens 340, the sub reflective sheet 100 can effectively reflect the light toward the optical lens 340. Therefore, the luminance of the backlight assembly 10 can be improved.

According to an example method of assembling the reflective sheet 15, the PCB 320 having the LED chip 330 mounted thereon is placed in the recessed portion 312 of the lower housing 310.

Then, the sub reflective sheet 100 is placed on the LED chip 330. Here, the sub reflective sheet 100 is placed such that the LED chip 330 can be exposed through the sub opening 130 of the sub reflective sheet 100.

Next, the optical lens 340 is installed. The lens supports 343 of the optical lens 340 are placed on the lower housing 310 exposed through the sub opening 130 of the sub reflective sheet 100 and then coupled onto the bottom portion 311 of the lower housing 310 by an adhesive or a double-sided tape.

The main reflective sheet 200 is mounted. The optical lens 340 pass through the main opening 210 of the main reflective sheet 200 such that the main reflective sheet 200 is placed over the surface of the lower housing 310 and an upper surface of the sub reflective sheet 100.

Then, the fitting portions 120 of the sub reflective sheet 100 are bent upward through the main opening 210 and then bent again toward the upper surface of the main reflective sheet 200, such that the sub reflective sheet 100 is fitted to the main reflective sheet 200 through the main opening 210.

Hereinafter, other embodiments of the inventive concept will be described.

Figure 7:
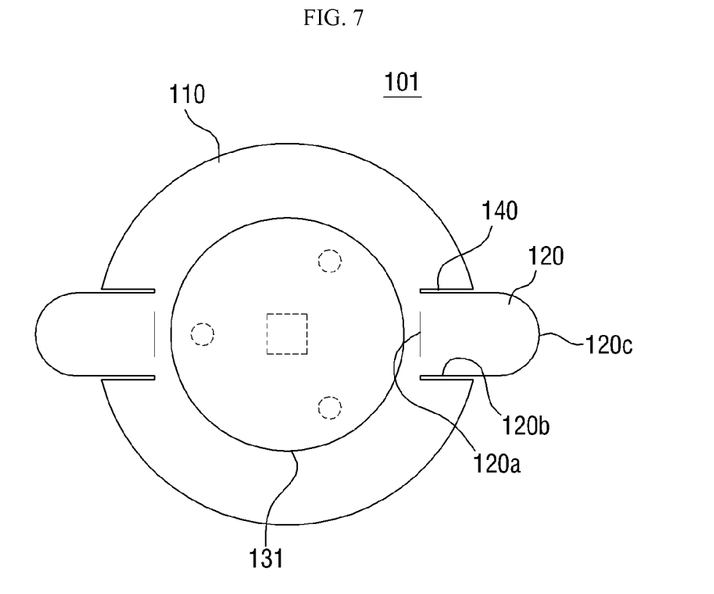
FIG. 7 is a plan view of a sub reflective sheet of a backlight assembly according to other embodiment of the inventive concept.

FIG. 7 is a plan view of a sub reflective sheet 101 of a backlight assembly according to other embodiment of the inventive concept. Referring to FIG. 7, the sub reflective sheet 101 according to the current embodiment is different from the sub reflective sheet 100 according to the embodiment of FIG. 5 in that a sub opening 131 is formed to surround the outside of a space in which lens supports are disposed. Since the sub opening 131 is formed wider, a reflective area is relatively reduced. However, since a pattern of the sub opening 131 is formed regardless of the positions of the lens supports, the sub reflective sheet 100 can be assembled easily.

Figure 8:
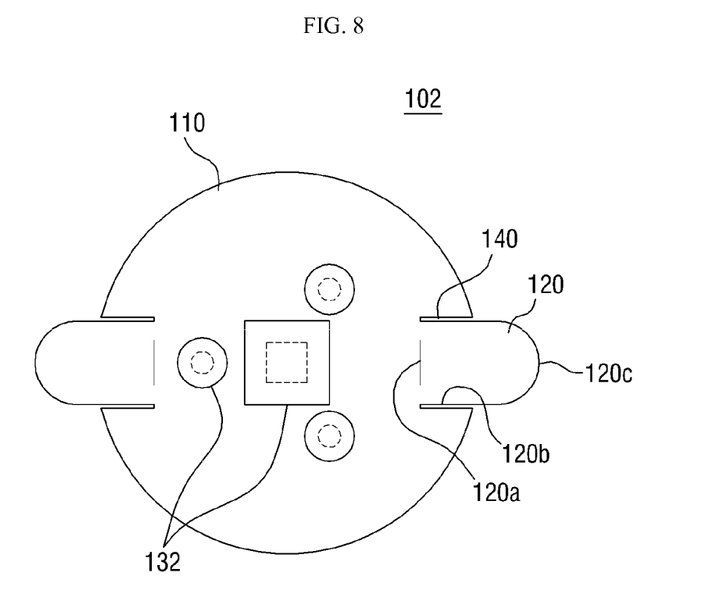
FIG. 8 is a plan view of a sub reflective sheet of a backlight assembly according to another embodiment of the inventive concept.

FIG. 8 is a plan view of a sub reflective sheet of a backlight assembly according to another embodiment of the inventive concept. Referring to FIG. 8, in the sub reflective sheet 102 according to the current embodiment, sub openings 132 are formed only in spaces in which an LED chip and lens supports of an optical lens are disposed, and a space other than these spaces serves as a reflective surface of the sub reflective sheet 102. Accordingly, in the current embodiment, a reflective area is relatively increased, thereby improving luminance.

Figure 9:
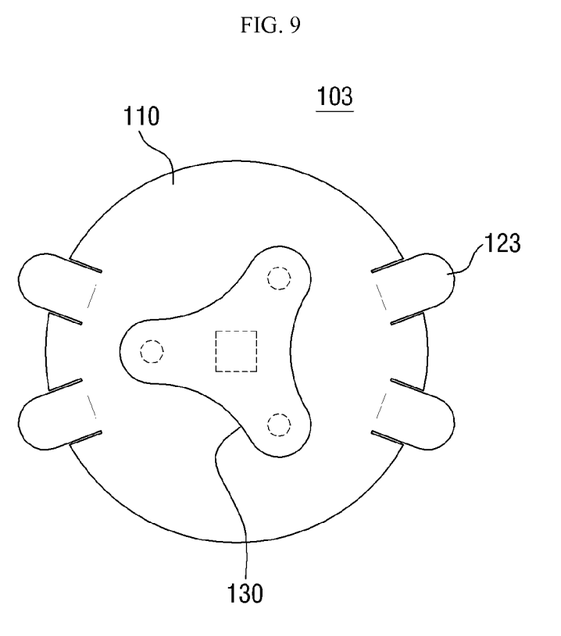
FIG. 9 is a plan view of a sub reflective sheet of a backlight assembly according to still another embodiment of the inventive concept.

FIG. 9 is a plan view of a sub reflective sheet of a backlight assembly according to still another embodiment of the inventive concept. Referring to FIG. 9, the sub reflective sheet 103 according to the current embodiment is different from the sub reflective sheet 100 according to the embodiment of FIG. 5 in that it includes four fitting portions 123. That is, two fitting portions 123 form a pair, and two pairs of the fitting portions 123 are arranged to have a line of symmetry. The increased number of the fitting portions 123 enables the sub reflective sheet 103 to be coupled more securely to a main reflective sheet 200.

Although not illustrated in the drawing, a plurality of fitting portions may also be arranged at regular intervals along an outer circumference of a body portion.

Figure 10:
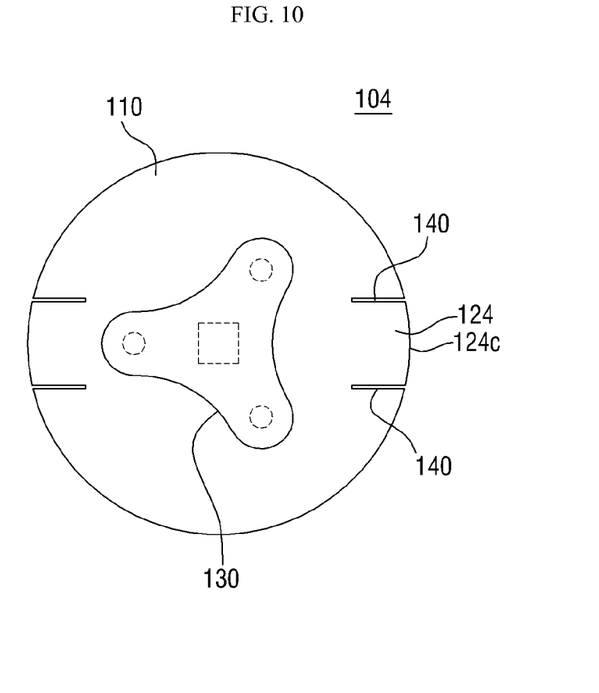
FIG. 10 is a plan view of a sub reflective sheet of a backlight assembly according to still another embodiment of the inventive concept.

FIG. 10 is a plan view of a sub reflective sheet of a backlight assembly according to still another embodiment of the inventive concept. Referring to FIG. 10, the sub reflective sheet 104 according to the current embodiment is different from the sub reflective sheet 100 according to the embodiment of FIG. 5 in that a second end 124*c* of each fitting portion 124 of the sub reflective sheet 104 is not protruded from an outer circumference of a body portion 110 but are formed along the outer circumference of the body portion 110 (that is, a part of a circle). Even if the fitting portions 124 is not protruded from the outer circumference of the body portion 110, the sub reflective sheet 104 can be fitted to a main reflective sheet 200 by placing the body portion 110 of the sub reflective sheet 104 on a lower surface of the main reflective sheet 200 and placing the fitting portions 124 on an upper surface of the main reflective sheet 200. For stable coupling, an overlap area between the periphery of the body portion 110 of the sub reflective sheet 104 and the main reflective sheet 200 may be increased relatively.

Figure 11:
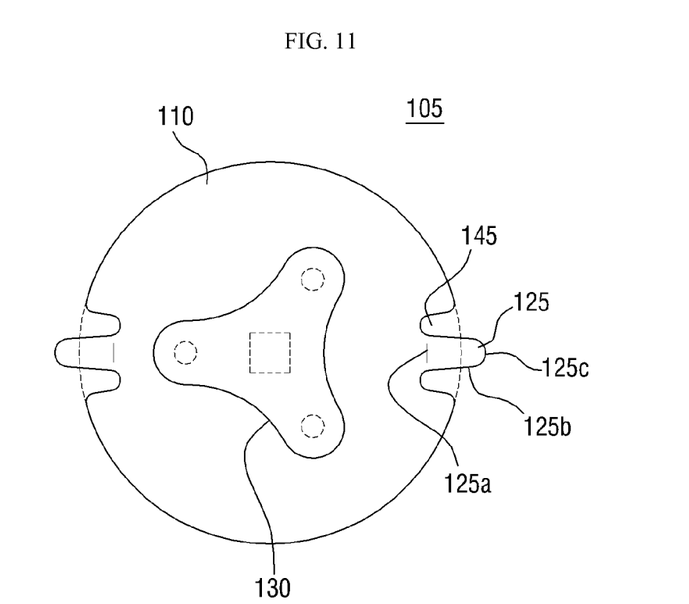
FIG. 11 is a plan view of a sub reflective sheet of a backlight assembly according to still another embodiment of the inventive concept.

FIG. 11 is a plan view of a sub reflective sheet of a backlight assembly according to still another embodiment of the inventive concept. Referring to FIG. 11, the sub reflective sheet 105 according to the current embodiment is different from the sub reflective sheet 100 according to the embodiment of FIG. 5 in that a cutting portion 145 separating each fitting portion 125 from a body portion 110 includes a concave portion whose width increases toward a second end 125c (toward an outer circumference of the body portion 110) and decreases toward a first end 125a (toward a center of the body portion 110). The second end 125c of each fitting portion 125 may be located outside the outer circumference of the body portion 110. Since both sides 125b of each fitting portion 125 are separated from the body portion 110 by the cutting portions 145 having the concave portions, the fitting portions 125 can move independently in a vertical direction with respect to the body portion 110. In addition, since the sides 125b of each fitting portion 125 are separated relatively far away from the body portion 110, the fitting portions 125 can move more freely. Accordingly, the sub reflective sheet 105 can be fitted to a main reflective sheet more easily in an assembling process.

Figure 12:
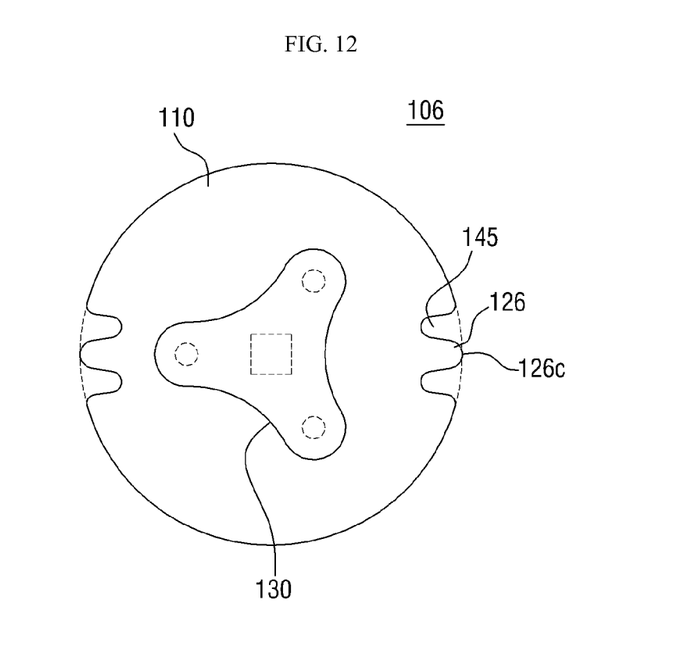
FIG. 12 is a plan view of a sub reflective sheet of a backlight assembly according to still another embodiment of the inventive concept.

FIG. 12 is a plan view of a sub reflective sheet of a backlight assembly according to still another embodiment of the inventive concept. Referring to FIG. 12, the sub reflective sheet 106 according to the current embodiment is different from the sub reflective sheet 105 according to the embodiment of FIG. 11 in that a second end 126c of each fitting portion 126 of the sub reflective sheet 106 is not protruded from an outer circumference of a body portion 110. The second end 126c of each fitting portion 126 may be formed along the outer circumference of the body portion 110. Even if the fitting portions 126 is not protruded from the outer circumference of the body portion 110, the sub reflective sheet 106 can be fitted to a main reflective sheet as described above in the embodiment of FIG. 10.

Figure 13:
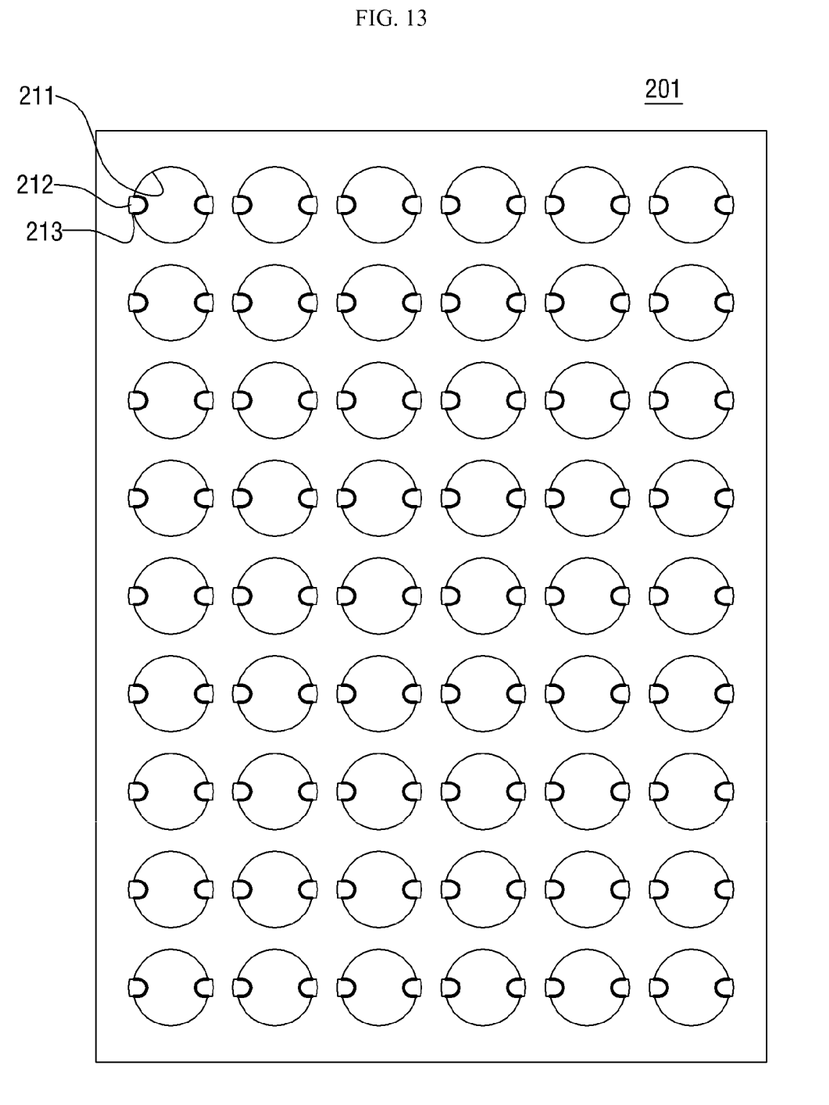
FIG. 13 is a plan view of a main reflective sheet of a backlight assembly according to still another embodiment of the inventive concept.
Figure 14:
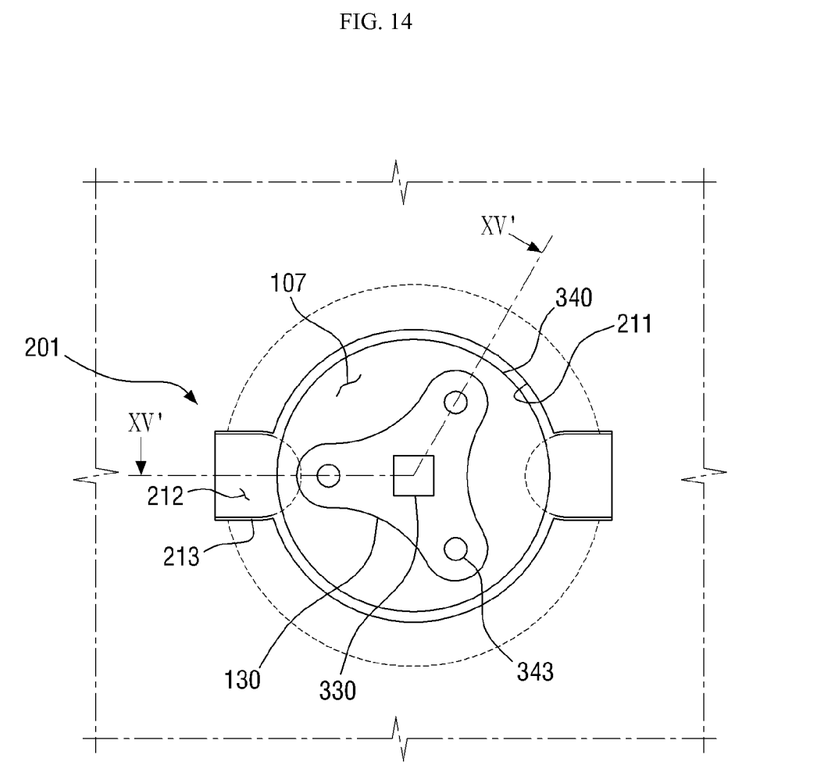
FIG. 14 is a partial layout view illustrating the main reflective sheet of FIG. 13 and a sub reflective sheet coupled to each other.
Figure 15:
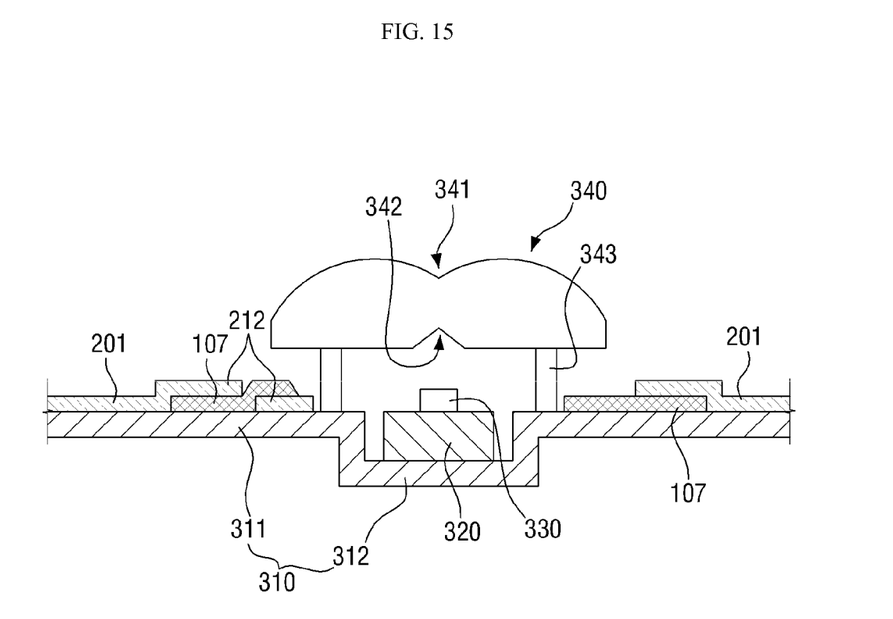
FIG. 15 is a cross-sectional view taken along the line XV-XV' of FIG. 14.

FIG. 13 is a plan view of a main reflective sheet of a backlight assembly according to still another embodiment of the inventive concept. FIG. 14 is a partial layout view illustrating the main reflective sheet of FIG. 13 and a sub reflective sheet coupled to each other. FIG. 15 is a cross-sectional view taken along the line XV-XV' of FIG. 14.

In the current embodiment, fitting portions 212 are formed not in the sub reflective sheet 107, but in the main reflective sheet 201. Referring to FIGS. 13 through 15, the main reflective sheet 201 may include reflective portion, main openings 211 and the fitting portions 212 which protrude from circumferences of the main openings 211 toward the centers of the main opening 211. The fitting portions 212 are separated from a body portion of the main reflective sheet 201 by cutting portions 213. Each fitting portion 212 has a first end connected to the body portion of the main reflective sheet 201, both sides separated from the body portion of the main reflective sheet 201, and a second end protruding toward a center of a corresponding main opening 211. Unlike the illustration in the drawings, the second end of each fitting portion 212 may not protrude from an inner circumferential surface of a corresponding main opening 211 but may be formed along the inner circumference of the corresponding main opening 211.

The sub reflective sheet 107 may include a body portion and a sub opening 130. The sub reflective sheet 107 may not have fitting portions. An outer circumference of the body portion of the sub reflective sheet 107 may be circular.

The main reflective sheet 201 is basically placed on a surface (e.g., an upper surface) of the sub reflective sheet 107, but the fitting portions 212 of the main reflective sheet 201 are placed on the other surface (e.g., a lower surface) of the sub reflective sheet 107. That is, the sub reflective sheet 107 may be fitted to the main reflective sheet 201 by the fitting portions 212 of the main reflective sheet 201. Therefore, in the current embodiment, the movement of the sub reflective sheet 107 relative to the main reflective sheet 201 is also limited, and the lifting of the main reflective sheet 201 or the sub reflective sheet 107 can be prevented or reduced.

Although not illustrated in the drawings, both a main reflective sheet and a sub reflective sheet may each include a body portion and fitting portions physically separated from the body portion.

Embodiments of the inventive concept provide at least one of the following advantages.

That is, even when an optical lens is disposed on an LED chip, since a sub reflective sheet is placed under the optical lens, luminance can be improved. In addition, since the sub reflective sheet and a main reflective sheet are fitted to each other, their relative movements are limited, which, in turn, prevents the lifting of the reflective sheets. Therefore, the light quality of a backlight assembly and the display quality of a display device can be improved.

However, the effects of the inventive concept are not restricted to the one set forth herein. The above and other effects of the inventive concept will become more apparent to one of daily skill in the art to which the inventive concept pertains by referencing the claims.

In concluding the detailed description, those skilled in the art will appreciate that many variations and modifications can be made to the preferred embodiments without substantially departing from the principles of the inventive concept. Therefore, the disclosed preferred embodiments of the inventive concept are used in a generic and descriptive sense only and not for purposes of limitation.

What is claimed is:

1. A backlight assembly comprising:
a housing;
a plurality of light sources disposed on the housing;
a plurality of optical lenses disposed on the light sources, respectively;
a main reflective sheet covering an upper surface of the housing and comprising a reflective portion and a main opening which exposes each of the optical lenses; and
a plurality of sub reflective sheets, each of the plurality of sub reflective sheets being disposed under each of the optical lenses,
wherein the plurality of sub reflective sheets do not overlap the plurality of light sources, and
wherein the each of the sub reflective sheets comprises a body portion and a fitting portion partially separated from the body portion and is fitted to the main reflective sheet in the reflective portion.

2. The backlight assembly of claim 1, wherein a periphery of the body portion of the each of the plurality of sub reflective sheets is disposed on one surface of the main reflective sheet and the fitting portion of the each of the plurality of sub reflective sheets is disposed on the other surface of the main reflective sheet.

3. The backlight assembly of claim 1, wherein a diameter of the body portion of the each of the plurality of sub reflective sheets is greater than a diameter of the main opening.

4. The backlight assembly of claim 1, further comprising a lens support which supports each of the optical lenses and separates each of the optical lenses from a surface of the housing, wherein each of the light sources comprises a light-emitting diode (LED) chip, and the each of the plurality of sub reflective sheets comprises a sub opening which exposes the LED chip and the lens support.

5. The backlight assembly of claim 2, wherein the fitting portion is partially separated from the body portion by a cutting portion.

6. The backlight assembly of claim 5, wherein the fitting portion comprises a first end, sides, and a second end, wherein the first end is formed integrally with the body portion.

7. The backlight assembly of claim 5, wherein the cutting portion comprises a concave portion whose width decreases toward the inside of the body portion.

8. The backlight assembly of claim 6, wherein the first end is located inside than an outer circumference of the body portion.

9. The backlight assembly of claim 6, wherein the second end is protruded toward the outside than the outer circumference of the body portion.

10. A backlight assembly comprising:
a housing;
a plurality of light sources disposed on the housing;
a plurality of optical lenses disposed on the light sources, respectively;
a main reflective sheet covering an upper surface of the housing and comprising a reflective portion, a fitting portion and a main opening which exposes each of the optical lenses; and
a plurality of sub reflective sheets, each of the plurality of sub reflective sheets being disposed under each of the optical lenses,
wherein the plurality of sub reflective sheets do not overlap the plurality of light sources, and
wherein the fitting portion is separated from the reflective portion by a cutting portion and is fitted to the each of the plurality of sub reflective sheets.

11. The backlight assembly of claim 10, wherein a periphery of the reflective portion of the main reflective sheet is disposed on one surface of the plurality of sub reflective sheets and the fitting portion of the main reflective sheet is disposed on the other surface of the plurality of sub reflective sheets.

12. The backlight assembly of claim 11, wherein a circumference of the each of the plurality of sub reflective sheets is larger than a circumference of the main opening.

13. The backlight assembly of claim 12, wherein the fitting portion comprises a first end, sides, and a second end, wherein the first end is formed integrally with the body portion.

14. The backlight assembly of claim 13, wherein the second end protrudes toward the inside of the main opening.

15. A display device comprising:
a display panel; and
a backlight assembly disposed under the display panel,
wherein the backlight assembly comprises:
a lower housing;
a plurality of light sources disposed on the housing;
a plurality of optical lenses disposed on the light sources, respectively;
a main reflective sheet covering an upper surface of the housing and comprising a reflective portion and a main opening which exposes each of the optical lenses; and
a plurality of sub reflective sheets, the plurality of sub reflective sheets being disposed under each of the optical lenses,
wherein the plurality of sub reflective sheets do not overlap the plurality of light sources, and
wherein each of the plurality of sub reflective sheets comprises a body portion and a fitting portion partially separated from the body portion and is fitted to the main reflective sheet in the reflective portion.

16. The display device of claim 15, wherein a periphery of the body portion of the each of the plurality of sub reflective sheets is disposed on a surface of the main reflective sheet and the fitting portion of the each of the plurality of sub reflective sheets is disposed on the other surface of the main reflective sheet.

17. The display device of claim 16, wherein the fitting portion is partially separated from the body portion by a cutting portion.

18. The display device of claim 17, wherein the fitting portion comprises a first end, sides, and a second end, wherein the first end is formed integrally with the body portion.

19. The display device of claim 18, wherein the first end is located inside of an outer circumference of the body portion.

20. The display device of claim 18, wherein the second end is protruded toward the outside than the outer circumference of the body portion.

* * * * *